United States Patent [19]
Fukuda et al.

[11] Patent Number: 4,830,916
[45] Date of Patent: May 16, 1989

[54] METHOD OF MANUFACTURING MOLDED PRODUCTS AND LAMINATED STRUCTURE INCLUDING THE MOLDED PRODUCTS MANUFACTURED ACCORDING TO THE METHOD

[75] Inventors: Hiroya Fukuda; Hitoshi Yaguchi, both of Yokohama; Kazuhumi Yokoyama, Yokosuka; Keiichiro Tabata; Takashi Ohashi, both of Yokohama, all of Japan

[73] Assignee: Bridgestone Corporation, Tokyo, Japan

[21] Appl. No.: 131,722

[22] Filed: Dec. 11, 1987

[30] Foreign Application Priority Data

Dec. 23, 1986 [JP] Japan ................. 61-312618

[51] Int. Cl.⁴ .................. B32B 11/04; B32B 27/40; C08J 9/00
[52] U.S. Cl. .................. 428/138; 428/95; 428/282; 428/317.1; 428/319.7; 428/423.1; 428/489; 521/83; 521/101
[58] Field of Search .................. 428/304.4, 423.1, 489, 428/95, 131, 137, 138, 280, 281, 282, 317.1, 319.7; 521/83, 101

[56] References Cited

U.S. PATENT DOCUMENTS

| 4,495,240 | 1/1985 | McCarthy | 521/83 |
| 4,737,524 | 4/1988 | Ako et al. | 521/83 |

FOREIGN PATENT DOCUMENTS 61-258822 11/1986 Japan ................. 521/101

Primary Examiner—William J. Van Balen
Attorney, Agent, or Firm—Fisher, Christen & Sabol

[57] ABSTRACT

A method of manufacturing molded products (or foamed and molded asphalt/urethane foam products) most suitable for sound-proof, vibration control and sealing members which are applied to the floor panel, dashboard and the like in a car, for example, and more particularly, a method of manufacturing foamed and molded asphalt/urethane products comprising introducing polyalkylene polyol having at least two or more hydroxyls in a molecule and polyisocyanate having two or more isocyanate radicals into a mold together with a catalyst and a foaming agent, and reacting them in it, wherein said polyalkylene polyol includes asphalt previously emulsified and dispersed therein; and a laminated structure including a layer of foamed asphalt/urethane foam made according to the method.

11 Claims, 2 Drawing Sheets

METHOD OF MANUFACTURING MOLDED PRODUCTS AND LAMINATED STRUCTURE INCLUDING THE MOLDED PRODUCTS MANUFACTURED ACCORDING TO THE METHOD

BACKGROUND OF THE INVENTION

1. Field of the Invention

The present invention relates to a method of manufacturing foamed and molded asphalt/urethane products. More particularly, it relates to molded products most suitable for sound-proof structures for cars, for example. Still more particularly, it relates to a method of manufacturing molded products most suitable for sound-proof structures for cars used as the dash board, floor panel, in the tire house and rear baggage chamber of the cars to shield any sound coming from outside and generated from the car body panel, said products being made flatter at their surface. It also relates to laminated structures including the molded products and manufactured according to the method.

2. Prior Art

FIG. 2 shows one of the conventional sound-proof structures for cars. As shown in FIG. 2, the conventional sound-proof interior material has a simple structure comprising an acoustical layer and a sound insulation layer. A vibration control material 20 which is usually a sheet of asphalt is closely stuck to the car body panel 10. Numeral 30 represents the acoustical layer made of flat felt or the like. Numeral 40 denotes the sound insulation surface layer, which is a carpet lined with a thermoplastic resin layer to enhance its sound insulation and molding capacities when it is used as the floor insulator. The acoustical layer 30 add the sound insulation surface layer 40 are stuck each other by the common sticking means or the like.

FIG. 3 is a sectional view showing another conventional sound-proof structure for cars, which is used as the dashboard insulator. The vibration control material 20 which comprises a sheet of asphalt or the like is welded to the car body panel 10. It is often found that felt is used as the acoustical layer 30 and that a sheet of PVC (polyvinyl chloride) or the like is used as the sound insulation surface layer 40. The acoustical layer 30 and the sound insulation surface layer 40 are also stuck each other by the common adhering means or the like in this case. In any case where it is used as the dashboard or floor insulator, the vibration control material 20 consisting of asphalt sheet or the like is intended to deal with vibration, and the sound insulation surface layer 40 consisting of carpet, asphalt sheet or the like combined with the acoustical layer 30 is used as the sound insulation structure.

In the case of these conventional sound-proof structures for cars, however, the vibration control material of asphalt used to control the vibration of the car body panel is different in function from the insulator of felt combined with carpet or PVC sheet to insulate sounds. They are therefore processed independently on the car assembly line, thereby increasing the number of processes on the assembly line.

The vibration control material of asphalt is cheap but heavy and it is not sufficinntly welded to the vertical wall such as the dashboard panel.

The acoustical material of felt or the like cannot be molded to sufficiently meet any unevenness of the car body panel. As the result, its sound-proofness cannot be sufficient and it cannot be made flat at its surface. Appearance and feeling in the viewpoint of its flatness cannot be kept high in quality, particularly when it is used as the floor insulator.

Those car body panel portions to which it is difficult to weld or stick the vibration control material cannot be made sufficiently sound-proof when only the acoustical material of felt or the like and the sound insulation surface layer are used.

In the case of the conventional sound-proof structures for cars, it is asked to deal with "discomfort sounds" transmitted into the car room. In the case of those structures shown in FIGS. 2 and 3, the following manners are well known to enhance their ability of shielding those sounds whose frequencies are lower than 500 Hz, for example, and to reduce noises in the car room:

(1) Making the vibration control material of asphalt type thicker, (2) making the acoustical layer thicker, and (3) making the sound insulation surface layer heavier.

When the manners (1) and (3) are employed, however, car weight is increased and efficiency of fuel is made lower. Even when the manner 2) is used, room space in the car is made smaller.

On the other hand, cars are asked these days to have higher and higher sound-proof and vibration control abilities. In addition to proposing the above-described layer structures, therefore, various kinds of materials themselves which can be used to form these layers have been discussed and proposed in relation totthese layer structures.

As one of these proposals, foamed urethane is immersed with asphalt or asphalt is added at the time of foaming urethane to form the foamed asphalt/urethane product. These products have good sound-proofness and damping characteristic.

Each of these products are supplied as a flat sheet and they cannot completely fit the unevenness of the car floor, dashboard or the like, thereby worsening their sound-proof and vibration control abilities so much The conventional method of manufacturing foamed asphalt/urethane products includes:

(1) melting asphalt in soft urethane having successive foams, immersing the soft urethane with the melted asphalt, and drying it, or immersing soft urethane, which has successive foams, with water base emulsion of asphalt and drying it, or immersing soft urethane, which has successive foams, in solvent-solved asphalt solution and drying it (which will be hereinafter referred to as immersion manner);

(2) reacting hydrophilic polyether polyol (which includes ethylene oxide more than 15%) with organic isocyanate to produce urethane polymer and reacting and foaming the thus-produced urethane polymer with water base emulsion of asphalt (which will be hereinafter referred to as foaming manner A);

(3) previously solving and blending asphalt in polyol such as polybutadiene polyol which is solvable with asphalt, and mixing and foaming it with organic isocyanate, catalyst, foaming agent and the like (which will be hereinafter referred to as foaming manner B); and (4) previously reacting polyalkylene polyol of polyether type, which is not solved with asphalt, with organic isocyanate to produce urethane polymer, solving asphalt with it, and mixing and foaming it with catalyst, foaming agent and the like (which will be hereinafter referred to as foaming manner C).

However, any of the above-mentioned manners is intended for the manufacture of foamed slabs and when molding is done using these manners, the following problem are caused. Molding is impossible when the immersion manner is employed. When the foaming manner A is used, products thus molded contain a lot of water. When they are thick as a product, therefore, their drying takes a long time and their dimension stability is poor because they contract remarkably when they are dried. In addition, they are humidified and swelled because of hydrophilic polyol used. They are not therefore practical. When the foaming manner B is employed, specific polyol used is expensive and curing of products thus manufactured is unpractically slow at the time of their molding. When the foaming manner C is employed, polyalkylene polyol used is more common than those used in the foaming manners A and B and it can therefore make the cost cheaper but the foaming stability and curing of the product thus manufactured are not good. In addition, contamination of asphalt is caused at the molding process. The product produced according to the foaming manner C is therefore impractical.

SUMMARY OF THE INVENTION

The present invention provides a method of manufacturing foamed and molded polyurethane products wherein polyalkylene polyol having at least two or more hydroxyls in a molecule and polyisocyanate having two or more isocyanate radicals in a molecule are injected into a mold together with a catalyst and a foaming agent and they are reacted there one another. This method of the present invention is characterized in that the polyalkylene polyol includes asphalt previously emulsified and dispersed. The present invention also provides laminated structures including the products manufactured according to the method and the laminated structures include a sound-proof structure for cars comprising a first layer of foamed asphalt/urethane molded in a mold having a mold of the car body panel, floor panel, dashboard or the like, for example, a second or intermediate layer of PVC sheet or the like placed on the foamed asphalt/ urethane layer and a third layer of an acoustical material placed on the second layer, wherein the foamed asphalt/urethane is molded in the mold into which polyalkylene polyol having at least two or more hydroxyls in a molecule and including asphalt previously emulsified add dispersed and polyisocyanate having two or more isocyanate radicals in a molecule are injected together with a catalyst and a foaming agent.

In the case of the sound-proof structure for cars according to the present invention, the acoustical layer also serves as a vibration-proof layer to prevent vibration from being transmitted. The intermediate layer of PVC sheet or the like and the foamed asphalt/urethane layer are laminate adjacent to each other to have the ability of controlling vibration. Therefore, the vibration of the car body panel can be controlled without any vibration control material of asphalt type. Further, the foamed asphalt/urethane layer can be foamed and molded by the mold having such a mold as to meet the form of the car body panel, floor panel or dashboard, thereby enabling it to closely stick the car body panel to enhance the vibration control effect. Furthermore, the laminated structure of the intermediate and acoustical surface layers serves to insulate any sound and when it is combined with the PVC sheet and foamed asphalt/urethane layer, the product thus formed needs no vibration control material of asphalt type and it is light in weight and high in sound-proof effect. When it is molded, it is a sound-proof structure smooth at its surface and good in its appearance and quality.

The foamed asphalt/urethane product which is used as the above-described foamed asphalt/urethane layer is manufactured as follows: Polyalkylene polyol in which asphalt was previously emulsified and dispersed is mixed with polyisocyanate, a catalyst and a foaming agent, injected into and molded by a mold. Foamed polyurethane thus produced includes asphalt dispersed like particulates. As the result, the foamed and molded asphalt/urethane product has no problem in its foaming stability, curing and molding capacities and it can serve as a sound-proof structure having high practice in the viewpoint of manufacture.

A first object of the present invention is to provide a manufacturing method of molded products capable of eliminating the drawbacks of the above-mentioned immersion manner, foaming manners A, B and C A second object of the present invention is to provide a manufacturing method of molded products most suitable for sound-proof structures which can enhance the sound-proofness against those sounds whsse frequencies are lower than 500 Hz, for example, and which can also enhance the feeling of flatness, without almost changing the thickness and weight of the sound-proof material used.

A third object of the present invention is to provide molded products most suitable for sound-proof structures for cars, for example, having high practice in the viewpoint of manufacture because the foamed asphalt/urethane layer is high in foaming stability and curing ability and because contamination of asphalt is not caused at the molding process.

DETAILED DESCRIPTION OF THE PREFERRED EMBODIMENT

The present invention will be described in detail citing a sound-proof structure for cars and referring to the accompanying drawings.

Figure 1:
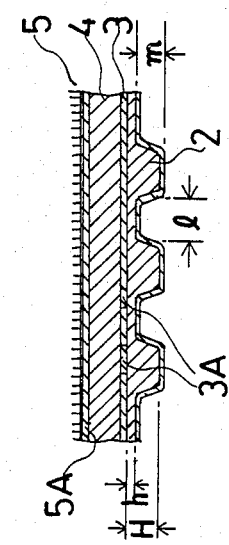
FIG. 1 is a sectional view showing an example of the sound-proof structure for cars according to the present invention.
Figure 3:
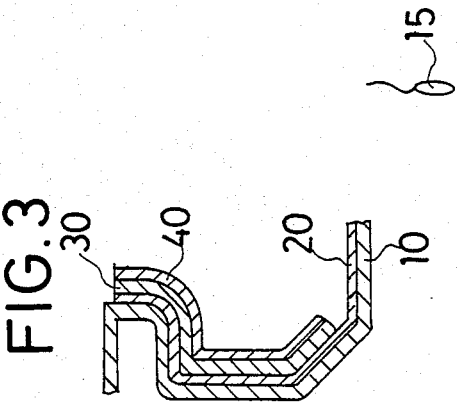
FIG. 3 is a sectional view showing another one of the conventional sound-proof structure for cars applied to the dashboard.

In FIG. 1, numeral 1 represents a car body panel, 2 a foamed asphalt/rrethane layer, 3 an intermediate layer comprising a sheet of PVC or the like, 4 an acoustical layer comprising felt, foamed urethane, molded urethane chips or the like, 5 a sound insulation surface layer made of a carpet, and 5A a thermoplastic resin layer lined on the carpet 5. The acoustical layer 4 and the intermediate layer 3 are previously bonded each other by a bonding agent or the like, then placed in a mold and molded together with the foamed asphalt/urethane layer 2 at the time when the layer 2 is foamed. When the intermediate layer 3 is provided with openings 3A, the foamed asphalt/urethane layer 2 and the acoustical layer 4 may be bonded at the foaming time, interposing the intermediate layer 3 between them.

Molding of the urethane chips is carried out by mixing polyurethane chips with a binder whose main agent is urethane polymer, reacting and hardening them under compressed state.

The foamed asphalt/urethane layer 2 may be provided with openings 2A. When the openings 2A are provided like this, the sound insulation ability can be enhanced. The opened area is preferably in a range of 5–40% relative to the whole area of the layer 2.

In order to further enhance sound-proof and vibration control effects achieved by the thermoplastic resin layer 5A lined on the carpet 5, a sheet of PVC, EPT (ethylene propylene terpolymer) or the like may be interposed between the thermo-plastic layer 5A and the acoustical layer 4.

A thick sheet of PVC, EPT or the like may be used instead of the carpet 5. This is effective when it is incorporated into the structure of the dashboard silencer.

There will be described the foamed asphalt/urethane which is used as the foamed asphalt/urethane layer in the present invention.

Polyalkylene polyol which is used to produce polyurethane foam of polyether type is preferable as polyol which is used to create the emulsion of asphalt and polyol because of its molding capacity and cost.

Alkylene oxide is added to and polymerized with polyhydric alcohol and amine compound, for example, and the matter thus created is used as polyalkylene polyol.

Polyhydric alcohols include divalent alcohols such as ethylene glycol, propylene glycol and 1,4-butanediol diethylene glycol; trivalent alcohols such as glycerin and trimethylol propane; and tetra- or more valent alcohols such as pentaerythritol, sorbitol and sucrose. Amine compounds include fatty polyamines such as ethylene amine and hexamethylene diamine; aromatic polyamines such as phenylenediamine and toluenediamine; and alkanol amine such as monoethanolamine diethanolamine and triethanolamine.

Alkylene oxides include ethylene oxide, propylene oxide, butylene oxide and the like. Ethylene oxide and propylene oxide ar more preferable of these alkylene oxides.

Both of ethylene and propylene oxides are used as polyol because of their molding and curing capacities, and tri-functional polyether polyol having a primary OH at its terminal and a molecular weight of 3000–5000 is more preferable.

Straight asphalt, blown asphalt, semi-blown asphalt, cut-back asphalt and the like are used as asphalt components which are dispersed like fine particulates in the polyols.

The weight ratio of polyalkylene polyol and asphalt is preferably in a range of 100:10–200 and more preferably 100:50–150 in view of the sound vibration characteristic of the form thus molded. As emulsified and dispersed asphalt is containe more and more, the damping characteristic of the foam is enhanced.

It is not limited how polyalkylene polyol and asphalt are emulsified, but it is preferable to use a surface-active agent. For example, a surface-active agent (such as polyoxyethylene (9) nonyl phenol and polyoxyethylene (40) stearate) which is in a range of HLB 13–18 is added to polyalkylene polyol which has been heated to about 100° C., and asphalt which has been heated and melted at 100°–200° C. is emulsified and dispersed in it using the stirrer such as the homogenizer.

The size of each of fine asphalt particulates which have been emulsified and dispersed in polyalkylene polyol is preferably in a range of 2–50 μm and more preferably 5–20 μm. It is because molding surfaces and others cannot be contaminated by asphalt bleeding.

Foaming and molding of polyalkylene polyol in which asphalt has been emulsified and dispersed as described above can be achieved by mixing and stirring this asphalt-emulsified and -dispersed polyalkylene polyol and polyisocyanate having two or more isocyanate radicals together with a catalyst, a foaming agent and the like and then introducing it into a mold.

Polyisocyanates used include aromatic polyisocyanates such as toluene diisocyanate and diphenyl methane diisocyanate; alicyclic polyisocyanates such as dicyolohexyl methane diisocyanate and isophorone diisocyanate; fatty polyisocyanates such as hexamethylene diisocyanate; denatured polyisocyanates; and two or more kinds of these matters.

Components which can be added at the foaming and molding process include those which are used to manufacture common polyurethane foams. Catalysts of amine and tin type, water and freon serving as the foaming agent, and surface-active agents of silicon type to control foamed cells can be cited, for example. If necessary, an inorganic filler, fire retardant and the like can be added.

Manufacture of the foamed asphalt/urethane foam:

Glycerin was used as a starting material; propylene oxide and ethylene oxide were added and polymerized; 200 weight parts of polyol (Boranol 4701 made by Dau Chemical Corporation) having a molecular weight less than 4700 and a primary OH, and 6 weight parts of each of the surface- active agents polyoxyethylene (9) nonyl phenol which was in a range of HLB 13.1 and polyoxyethylene (40) stearate which was in a range of HLB 16.9 were added; the mixture thus created was heated to 100° C.; 200 g of straight asphalt 80/100 which was heated to 100° C. and melted was added and mixed using the homogenizer; and polyalkylene polyol in which asphalt was emulsified and dispersed was thus produced.

Added to 400 g of this asphalt-emulsified and -dispersed polyalkylene polyol were 2.5 g of water, 3.0 g of a catalyst of amine type (Dabuco 33LV made by Sankyo Aero Products Corporation) and 2.5 g of a surface-active agent of silicon type (L-520 made by Japan Unika Corporation), and 32 g of toluene diisocyanate (Coronate T-80 made by Japan Polyurethane Corporation) was then added and mixed and stirred to produce a raw material (A) for the foamed asphalt/urethane form. This raw material (A) was introduced into a mold having a form corresponding to the car body panel which will be mentioned later, or a mold (molding temperature was 50° C.) made of aluminum and having a maximum height (H) of 30 m/m, a minimum height (h) of 5 m/m, a width of 300 m/m and a length of 300 m/m (five convexes and five concaves were provided and their intermediate length (l) was 30 m/m), cured for ten minutes at a temperature of 70° C. in an oven, and a foamed and molded asphalt/urethane foam product (A) was then taken out.

The product (A) could be easily released from the mold without contaminating the mold with asphalt and it had a good appearance.

The product (A) had such values as shown in Table 1.

TABLE 1

| | |
|---|---|
| Density (9/cm³) | 0.140 |
| Elongation (%) | 120 |
| Tensile strength (Kg/cm³) | 1.2 |
| Hardness* | 60 |

*Hardness was measured using the surface hardness meter of Ascar F type.

Manufacture of sound-proof structures for cars:

Sound-proof structures for cars were manufactured using the above-mentioned foamed and molded asphalt/urethane foam product (A) and the following materials.

Our structure example 1:
Iron plate 0.8 t (car body panel, 300 m/m wide and 300 m/m long, provided with five convexes and five concaves; their intermediate length (l) was 30 m/m and the height (m) of each of the convexes was 25 m/m; and this was hereinafter referred to as iron plate (A))+layer of the foamed and molded asphalt/urethane foam product (A)+PVC sheet 1t+ urethane chips 15t molded+PE poly ethylene) backing carpet (see FIG. 1).

Our structure example 2:
Iron plate (A) 0.8 t+layer of the foamed and molded asphalt/urethane foam product (A)+PVC sheet 1 t+felt 15 t+PE backing carpet.

Our structure example 3:
Iron plate (A) 0.8 t+layer* of the foamed and molded asphalt/urethane foam product (A)+PVC sheet 1 t+urethane chips 15 t molded+PE backing carpet.
* Ratio of opene area was 16%.

| | Specific gravity |
|---|---|
| Foamed asphalt/urethane foam layer | 0.1 |
| Urethane chips molded | 0.1 |
| PVC sheet | 1.7 |
| Felt | 0.05 |

Figure 2:
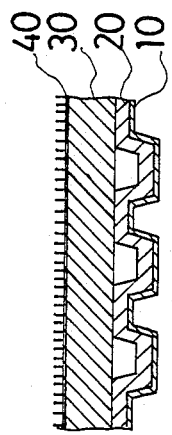
FIG. 2 is a sectional view showing one of the conventional sound-proof structures for cars applied to the car body panel.

Poly ethylene backing carpet 0.85 kg/m²
Comparative structure example:
Iron plate (A) 0.8 t+asphalt sheet 2 t (uneven to fit to the iron plate)+felt 25 t+PE backing carpet (see FIG. 2).

Figure 4:
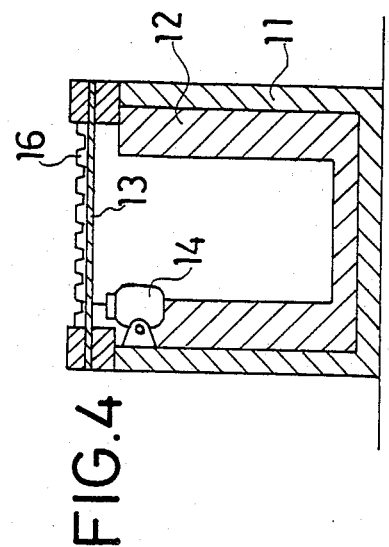
FIG. 4 is a sectional view showing a device for measuring sound-proof effect.

Evaluation of sound-proof structures for cars:
Evaluation was done using the device shown in FIG. 4. Numeral 11 represents a sound-proof box in which samples are to be fixed and which is made by a material, large in mass and sufficient in sound insulation ability. An acoustical material 12 is stuck to the inner face of the box 11. An iron plate 13 of 0.8 t corresponds to the one of the car body and mounted on the top of the sound-proof box 11 in such a way that its circumferential rim portion is fixed to the box 11. The iron plate 13 is vibrated by a vibrator 14 to cause sound. The sound thus caused is measured by a microphone 15. A sound-proof structure (or sound-proof material sample) 16 is placed on the iron plate 13 and the sound caused from the iron plate 13 is insulated by the sound-proof material sample 16. When the iron plate 13 is vibrated by a certain vibrating input, therefore, it can be understood that the lower the sound pressure level measured by the microphone 15 becomes, the better the sound-proof ability of the sound-proof structure 16 is.

The comparative structure example employed felt and the conventional vibration control material of asphalt type.

Figure 5:
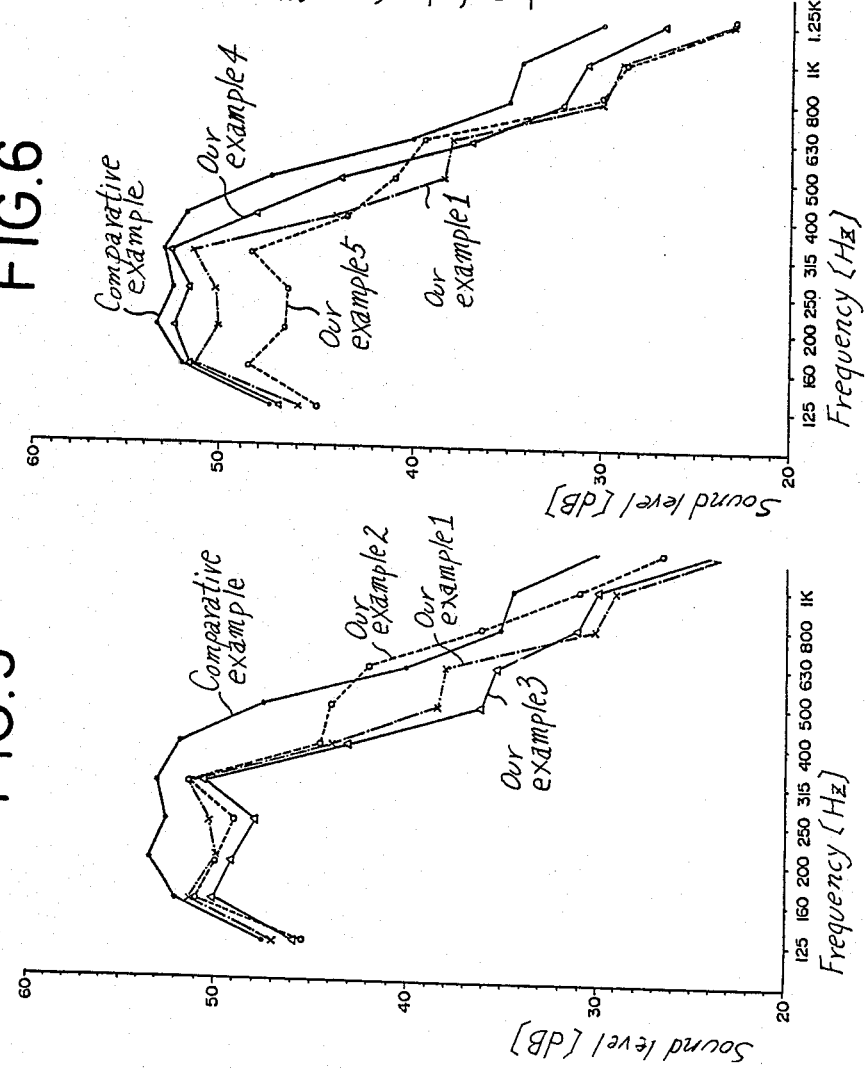

FIG. 5 shows results thus measured. As apparent from FIG. 5, any of our structure examples 1, 2 and 3 can achieve better sound-proof effect than the comparative structure example. Particularly, our structure example 1 in which the urethane chips molded were used is more excellent in the ability of its sound-proofing those sounds whose frequencies are higher than 500 HZ, as compared with our structure example 2 in which felt was employed. Our structure example 3 provided with openings is better in the ability of its sound-proofing those sounds whose frequencies are in medium and low bands, that is, lower than 800 Hz, as compared with our structure example 1 provided with no opening.

Figure 6:
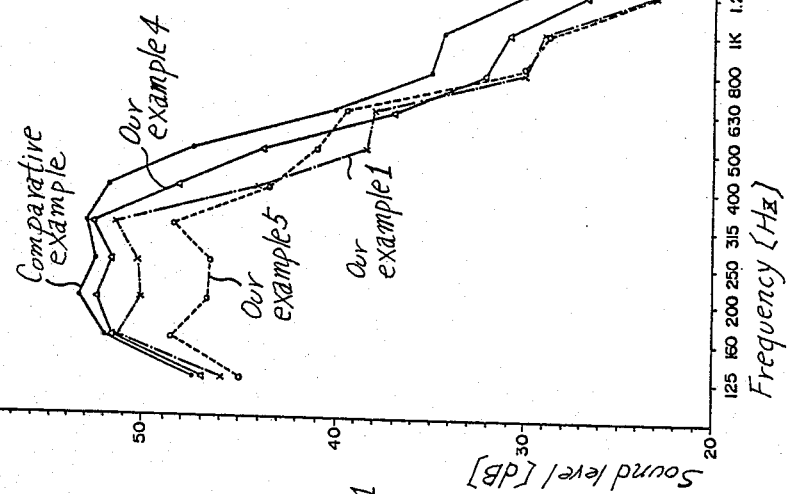
FIGS. 5 and 6 are graphs showing results, which were measured by the device, in relation to frequency and sound pressure level.

FIG. 6 shows results obtained using the following structure examples to evaluate what effects the thickness of the PVC sheet has.

Comparative structure example:
Iron plate (A) 0.8 t+asphalt sheet 2 t (uneven to fit to the iron plate)+felt 25 t+PE backing carpet.

Our structure example 4:
Iron plate (A) 0.8 t+layer of foamed and molded asphalt/urethane foam product (A)+PVC sheet 0.5 t+urethane chips molded 15 t+PE backing carpet.

Our structure example 5:
Iron plate (A) 0.8 t+layer of foamed and molded asphalt/urethane foam product (A)+PVC sheet 2 t+urethane chips molded 15 t+PE backing carpet.

As apparent from FIG. 6, the sound pressure level is made lower and lower at a frequency band lower than 500 Hz as the PVC sheet becomes thicker and thicker.

On the other hand, our structure example in which PVC sheet 0.5 t was employed shows a sound-proof ability equal to or more excellent than that of the structure example to be compared.

The vibration control ability (or sound vibration characteristic) of the foamed and molded asphalt/urethane foam product itself was checked for reference according to the following measuring manner.

Measuring manner:
The center of a sample which is made by bonding the foamed and molded flat asphalt/urethane foam product, 10 mm thick, to a flat iron plate, 0.8 mm thick, is vibrated by the vibrator. Loss factors (temperature 20° C.) are calculated from a resonance curve obtained by forces outputted from the impedance head and vibration speeds accelerated.

Figure 7:
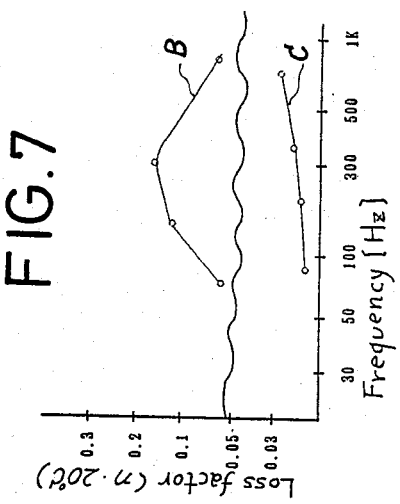
FIG. 7 is a graph showing results measured about vibration control capability (or sound vibration characteristic).

FIG. 7 shows results thus measured. B in FIG. 7 denotes results obtained about our molded product and C represents those obtained about the common urethane foam . As shown in FIG. 7, it can be understood that our foamed and molded foam product has higher loss factors and better vibration control ability (or sound vibration characteristic).

According to the present invention, there can be provided a sound-proof structure capable of enhancing its sound-proof ability relative to those sounds whose frequencies are low (or lower than 500 Hz) without changing the thickness and weight of its sound-proof material, and also improving the feeling of its flatness. Further, our molded product which forms the foamed asphalt/urethane foam layer has higher foaming stability and better curing ability. In addition, the mold cannot be contaminated with asphalt at the foaming process. This therefore makes it possible to provide a sound-proof structure for cars, for example, which is mmore highly practical in its manufacture.

We claim:

1. A method of manufacturing molded polyurethane foam products comprising introducing polyalkylene polyol having at least two or more hydroxyls in a molecule, and polyisocyanate having two or more isocyanate radicals into a die together with a catalyst and a foaming agent, and reacting them in it, wherein said polyalkylene polyol contains asphalt previously emulsified and dispersed therein.

2. A laminated structure including a layer of foamed asphalt/urethane foam, wherein said asphalt/urethane foam is a foamed and molded product obtained by introducing polyalkylene polyol having at least two or more hydroxyls in a molecule and asphalt previously emulsified and dispersed therein, and oplyisocyanate having two or more isocyanate radicals into a mold together with a catalyst and a foaming agent, and reacting them in it.

3. A laminated structure including a sound-proof structure for cars comprising a first layer of foamed asphalt/urethane foam, an intermediate layer of a plastic sheet placed on the foamed asphalt/urethane foam layer, and a third layer of an acoustical material, wherein said foamed asphalt/urethane foam is a foamed and molded product obtained by introducing polyalkylene polyol having at least two or more hydroxyls in a molecule and asphalt previously emulsified and dispersed therein, and polyisocyanate having two or more isocyanate radicals into a mold together with a catalyst an a foaming agent, and reacting them in it.

4. A laminated structure according to claim 3 wherien the foamed asphalt/urethane foam layer is molded to fit the uneven surface of a car body panel.

5. A laminated structure according to claim 3 wherein said acoustical material layer is made by urethane foam or urethane foam chips molded.

6. A laminated structure according to claim 3, wherein said foamed asphalt/urethane foam layer is provided with openings.

7. A laminated structure according to claim 2 wherein the foamed asphalt/urethane foam layer is molded to fit the uneven surface of a car body panel.

8. A laminated structure according to claim 7 wherein said acoustical material layer is made by urethane foam or urethane foam chips molded.

9. A laminated structure according to claim 7 wherein said foamed asphalt/urethane foam layer is provided with openings.

10. A laminated structure according to claim 8 wherein said foamed asphalt/urethane foam layer is provided with openings.

11. A laminated structure according to any one of claims 3, 4, 5, 6, 7, 8, 9 or 10, further comprising a sound insulation surface layer lined with a thermoplastic resin layer.

* * * * *